US009801008B2

(12) United States Patent
Zhu et al.

(10) Patent No.: US 9,801,008 B2
(45) Date of Patent: Oct. 24, 2017

(54) WIRELESS COMMUNICATION METHOD WITHOUT PAIRING IDENTITIES IN ADVANCE AND DEVICE THEREOF

(71) Applicant: Beken Corporation, Shanghai (CN)

(72) Inventors: Lizhen Zhu, Shanghai (CN); Ronghui Kong, Shanghai (CN); Bo Jia, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 217 days.

(21) Appl. No.: 14/848,361

(22) Filed: Sep. 9, 2015

(65) Prior Publication Data

US 2017/0055107 A1    Feb. 23, 2017

(30) Foreign Application Priority Data

Aug. 18, 2015 (CN) .......................... 2015 1 0508883

(51) Int. Cl.
  *H04W 4/00* (2009.01)
  *H04L 1/16* (2006.01)
(52) U.S. Cl.
  CPC .............. *H04W 4/008* (2013.01); *H04L 1/16* (2013.01)
(58) Field of Classification Search
  CPC .................................. H04W 4/008; H04L 1/16
  See application file for complete search history.

(56) References Cited

U.S. PATENT DOCUMENTS

2004/0212493 A1\* 10/2004 Stilp .................... G06K 7/0008
  340/531
2016/0286341 A1\* 9/2016 Lee ..................... H04W 76/023

FOREIGN PATENT DOCUMENTS

CN      101714289 A      5/2010

OTHER PUBLICATIONS

Machine translation of Luo (CN 101714289) published Nov. 2, 2011.\*

\* cited by examiner

*Primary Examiner* — Devan Sandiford
(74) *Attorney, Agent, or Firm* — Perkins Coie LLP

(57) ABSTRACT

A wireless communication method without pairing IDs in advance, comprises: transmitting, at a first power, a first ID within a first pipe; searching for a second ID on at least one frequency point, wherein the second ID matches the first ID; if the second ID is not found within the first pipe, respectively transmitting, at least at a second power and a third power, at least two matching-code requests within a public pipe on public frequency points; receiving ACKs responding to each of the matching-code requests from different devices; summing numbers of the received ACKs from each device; comparing the summed numbers of the received ACKs from the different devices to get a maximum number; switching from a public pipe to a third pipe of a device that sent the maximum number of ACKs; transmitting a matching-code package to the device that sent the maximum number of ACKs.

18 Claims, 6 Drawing Sheets

WIRELESS COMMUNICATION METHOD WITHOUT PAIRING IDENTITIES IN ADVANCE AND DEVICE THEREOF

CLAIM OF PRIORITY

This application claims priority to Chinese Application number 201510508883.1, entitled "A WIRELESS COMMUNICATION METHOD WITHOUT PAIRING IDENTITIES IN ADVANCE AND DEVICE THEREOF," filed on Aug. 18, 2015 by Beken Corporation, which is incorporated herein by reference.

TECHNICAL FIELD

The present application relates to wireless communication and more particularly, but not exclusively, to a wireless communication mechanism without pairing identities (IDs) in advance.

BACKGROUND OF THE INVENTION

In a wireless mouse and keyboard application, the mouse (or the keyboard) and a dongle should be paired in advance. In this case, a printed circuit board (PCB) needs to use a memory to store the ID information, and a step for printing the IDs on devices needs to be added in production, which increases costs for hardware and labor. The costs are especially important nowadays as competition becomes more drastic.

Accordingly, a new device and method that overcome these issues are desirable.

BRIEF DESCRIPTION OF THE INVENTION

According to the embodiment of the invention, a device and method use the wireless communication mechanism without pairing IDs in advance to reduce the costs for the matching-code.

In an embodiment, the method comprises: transmitting, at a first power, a first ID within a first pipe; searching for a second ID on at least one frequency point, wherein the second ID matches the first ID; if the second ID is not found within the first pipe, respectively transmitting, at least at a second power and a third power, at least two matching-code requests within a public pipe on public frequency points, wherein the first power, the second power and the third power are different from each other; receiving ACKs responding to each of the matching-code requests from different devices; summing numbers of the received ACKs from each device; comparing the summed numbers of the received ACKs from the different devices to get a maximum number; switching from a public pipe to a third pipe of a device that sent the maximum number of ACKs; transmitting a matching-code package to the device that sent the maximum number of ACKs, wherein the matching-code package includes the first ID and the device that sent the maximum number of ACKs is identified by a third ID; and terminating communication on one of the public frequency points.

In another embodiment, the method comprises: determining whether a first matching-code request has been received within a public pipe or a second pipe on one of public frequency points, if the first matching-code request is received within the public pipe, returning ACK to a device identified by a first ID, the ACK including a second ID matching the first ID; receiving a matching-code package within a second pipe, wherein the matching-code package includes the first ID; storing the first ID; and switching from public pipe to a first pipe; terminating communication on one of the public frequency points.

In still another embodiment, the device comprises: a first transmitting unit, configured to transmit, at a first power, a first ID within a first; a first searching unit, configured to search for a second ID on at least one frequency point, wherein the second ID matches the first ID; a determining unit, configured to determine whether the second ID can be found within the first pipe; a second transmitting unit, configured to transmit, at least at a second power and a third power, at least two matching-code requests within a public pipe on public frequency points if the second ID cannot be found within the first pipe, wherein the first power, the second power and the third power are different from each other; a first receiving unit, configured to receive ACKs responding to each of the matching-code requests from different devices; a summing unit, configured to sum numbers of the received ACKs from each device; a comparing unit, configured to compare the summed numbers of the received ACKs from the different devices to get a maximum number; a first switching unit, configured to switch from public pipe to a third pipe of a device that sent the maximum number of ACKs based on the maximum number; a third transmitting unit, configured to transmit a matching-code package to the device that sent the maximum number of ACKs, wherein the matching-code package includes the first ID and the device that sent the maximum number of ACKs is identified by a third ID; and a first terminating unit, configured to terminate communication on one of the public frequency points.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details. Additionally, some well-know structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1:
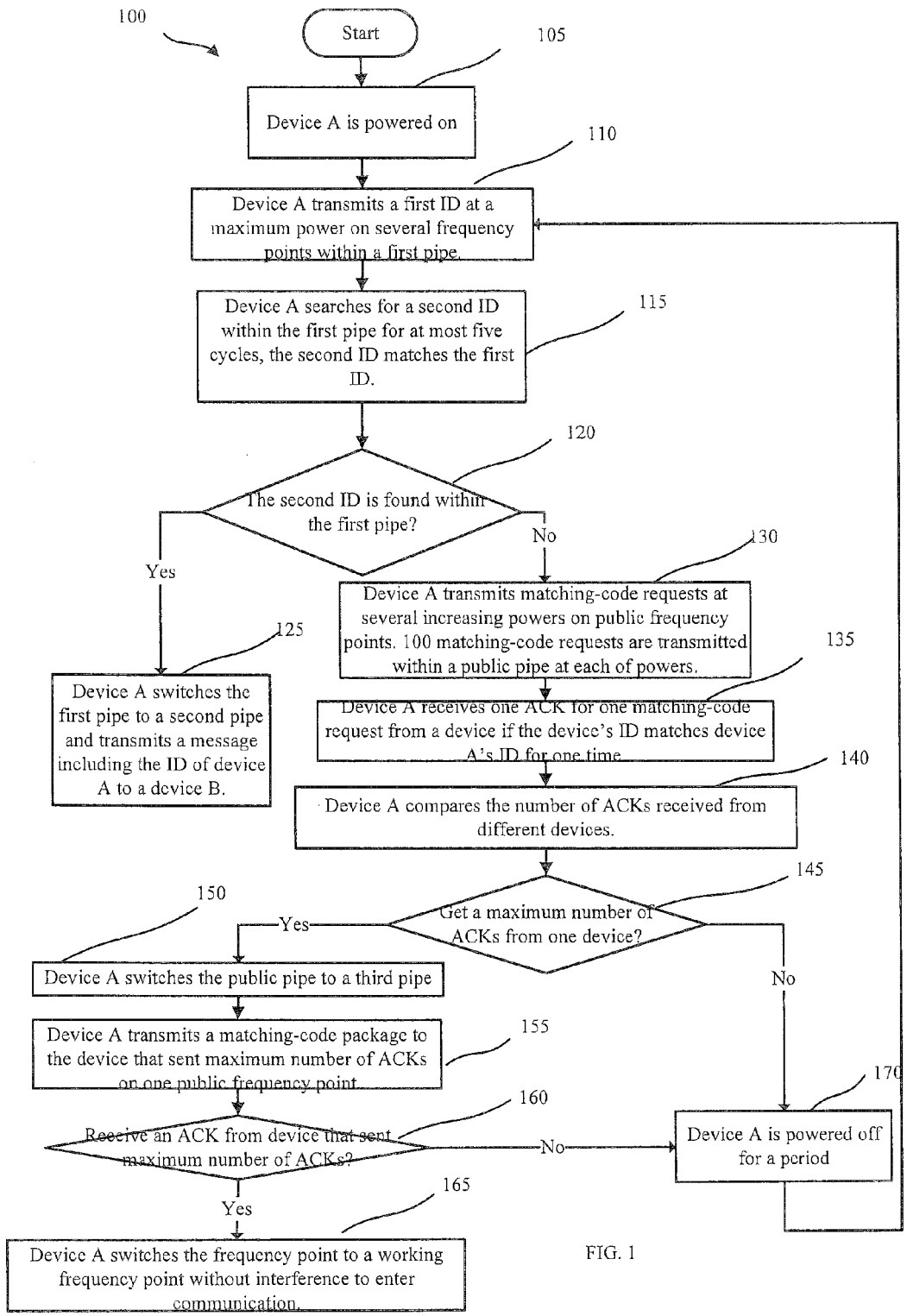
FIG. 1 is a flowchart of a method for wireless communicating without pairing IDs in advance according to an embodiment of the invention.

FIG. 1 is a flowchart of a method 100 for wireless communicating without pairing IDs in advance according to an embodiment of the invention. In one embodiment, device A is a mouse or a keyboard and device B is a dongle, for example. The method can also be applied in a remote-controlled aircraft, an intercom system or any other system pairing IDs in advance. Each of devices is identified by 16 bit ID. As a result, the probability for encountering a product with a same ID in a certain working area is negligible in actual use. The ID is placed on the chip of the device by fusing or other mechanism. Only devices having same ID can communicate with each other. The devices usually work in Industrial Scientific Medical (ISM) band that has about 100 frequency points. The devices can choose 16 frequency points for hopping, in order to avoid interference.

In the FIG. 1, first, device A is powered on (105). Then device A transmits (110) a signal at a power on several frequency points within a first pipe. In one embodiment, the signal includes address information of device A. The address information can be device A's ID. The power is a maximum power. Device A searches for (115) a device B within the first pipe for at most five cycles and device B has an ID which matches the ID of device A. If (120) device B is found within the first pipe, device A switches (125) from the first pipe to a second pipe and transmits a message including the ID of device A to device B. Then, device A terminates the communication on the frequency point. In one embodiment, if device B is not found within the first pipe, device A transmits (130) matching-code requests at several increasing powers on public frequency points. In one embodiment, 100 matching-code requests are transmitted within a public pipe at each power. Then, device A receives (135) one ACK for one matching-code request from a device if the device's ID matches device A's ID for onetime. Device A compares (140) the number of ACKs received from different devices. Determining whether device A gets (145) a maximum number of ACKs from one device? If yes, device A switches (150) the public pipe to a third pipe. Then, device A transmits (155) a matching-code package to the device that sent maximum number of ACKs on one public frequency point, wherein the matching-code package includes the device A's ID. That is, the device that sent the maximum number of ACKs is the device B, which can match with the device A. Then, device A terminates the communication on the frequency point. In another embodiment, if device A didn't get a maximum number of ACKs from one device, device A is powered off (170) for a period. The method 100 then ends.

In one embodiment, the method 100 further comprises receiving a message including a working frequency point without interference from device B, wherein device A and device B are configured to communicate on the working frequency point.

Figure 2:
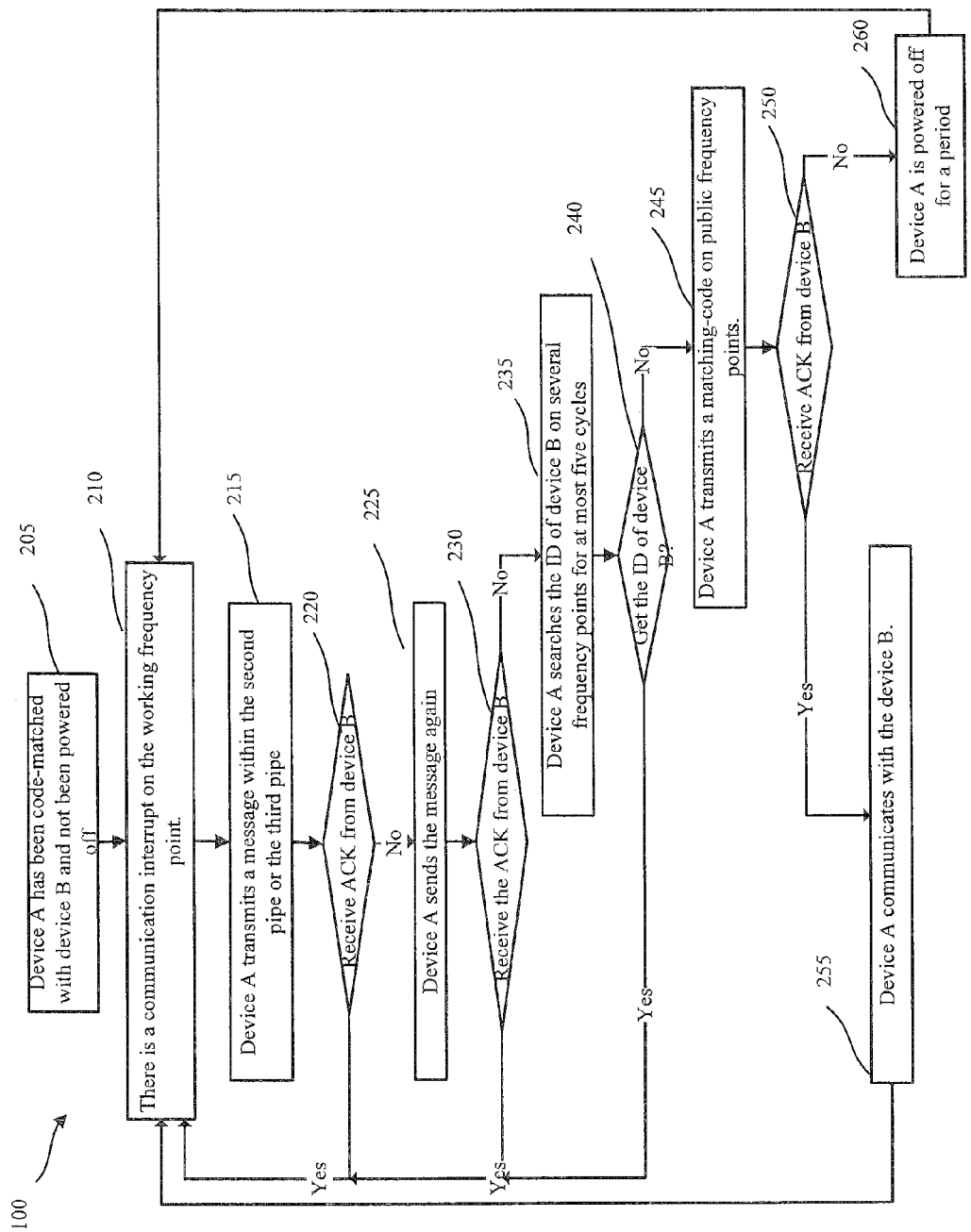
FIG. 2 is a continuation of the method illustrated in FIG. 1.

FIG. 2 is a continuation of the method 100 illustrated in FIG. 1. In one embodiment, device A has code-matched (205) with device B and not been powered off. If there is (210) a communication interrupt on the working frequency point, then device A transmits (215) a message within the second pipe or the third pipe. The method 100 determines whether device A receives (220) ACK from device B. If yes, the method 100 returns to 210. If no, device A sends (225) the message again. The method 100 determines again whether device A receives (230) ACK from device B. If yes, the method 100 returns to 210. If no, device A searches (235) for the ID of device B on several frequency points for at most five cycles. The method 100 determines whether device A gets (240) the ID of device B. If yes, the method 100 returns to 210. If no, device A transmits (245) a matching-code on public frequency points. The method 100 determines whether device A receives (250) ACK from device B. If yes, device A communicates (255) with the device B. If no, device A is powered off (260) for a period. The method 100 then ends.

Figure 3:
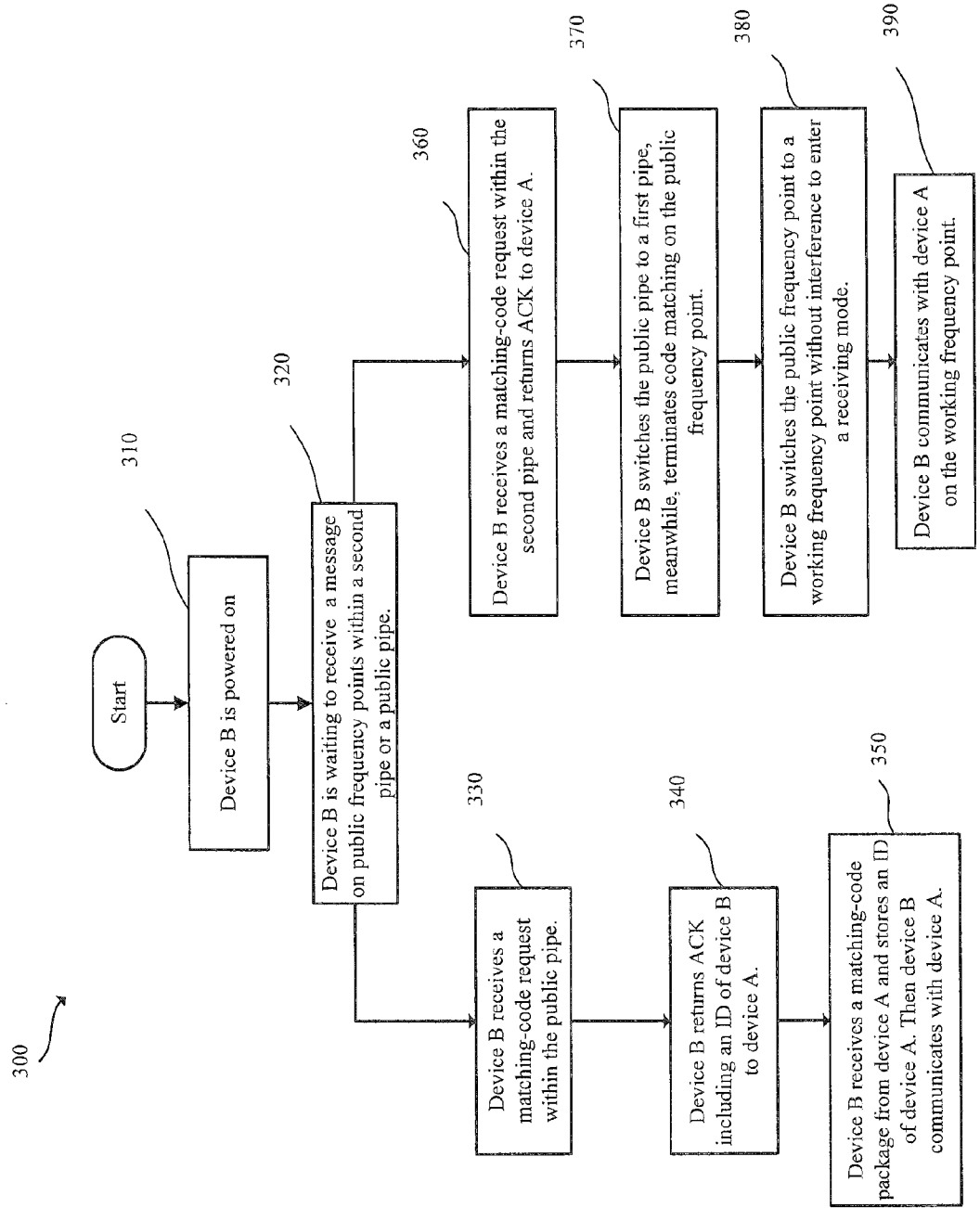
FIG. 3 is a flowchart of a part of a method for wireless communicating without pairing IDs in advance according to another embodiment of the invention.

FIG. 3 is a flowchart of a part of a method 300 for wireless communicating without pairing IDs in advance according to another embodiment of the invention. First, device B is powered on (310). Then, device B waits (320) to receive a message on public frequency points within a second pipe or a public pipe. If device B receives (330) a matching-code request within the public pipe, then device B returns (340) ACK including an ID of device B to device A. Device B receives (350) a matching-code package from device A and stores an ID of device A. Then device B communicates with device A. If device B receives (360) a matching-code request within the second pipe and returns ACK to device A, then device B switches (370) from the public pipe to a first pipe, meanwhile, terminates code matching on the public frequency point. Then device B switches (380) the public frequency point to a working frequency point without interference to enter a receiving mode. Device B communicates (390) with device A on the working frequency point. The method 300 then ends.

Figure 4:
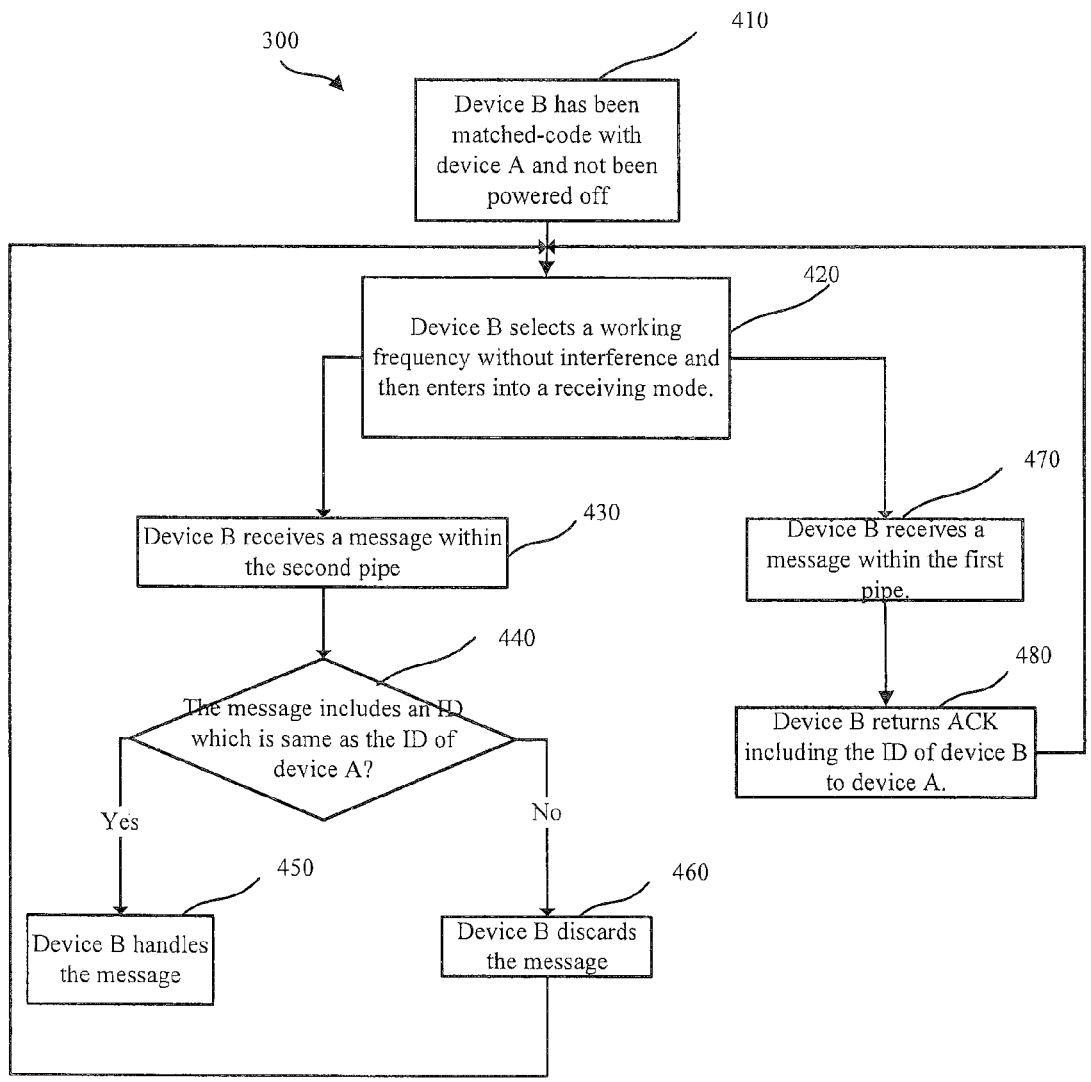
FIG. 4 is a continuation of the method illustrated in FIG. 3.

FIG. 4 is a continuation of the method 300 illustrated in FIG. 3. In one embodiment, device B has matched-code (410) with device A and has not been powered off. Then device B selects (420) a working frequency without interference and then enters into a receiving mode. If device B receives (430) a message within the second pipe, then the method 300 determines whether the message includes (440) an ID that same as the ID of device A. If yes, device B handles (450) the message. If no, device B discards (460) the message. Then, the method 300 returns to 420. In one embodiment, if device B receives (470) a message within the first pipe, (for example, device A is restarted and transmits a message through the first pipe), then device B returns (480) ACK including the ID of device B to device A. The method 300 returns to 420.

Figure 5:
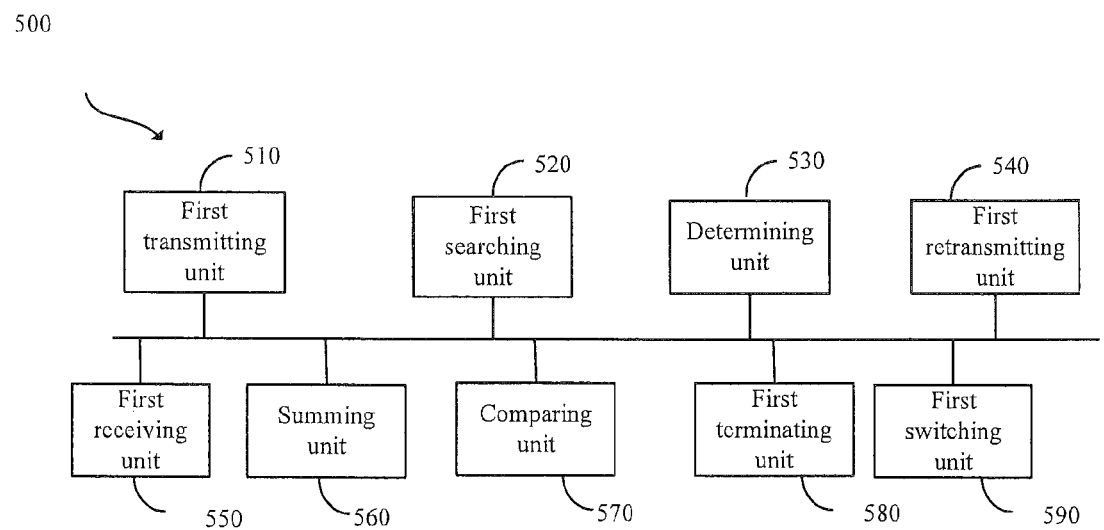
FIG. 5 is a diagram illustrating an embodiment of a device performing the method shown in FIGS. 1 and 2.

FIG. 5 is a diagram illustrating an embodiment of a device 500, such as mouse or keyboard, performing the method 100 shown in FIGS. 1 and 2. The device 500 comprises: a first transmitting unit 510, a first searching unit 520, a determining unit 530, a first retransmitting unit 540, a first receiving unit 550, a summing unit 560, a comparing unit 570, a first switching unit 580, and a first terminating unit 590. In one embodiment, the first transmitting unit 510 is configured to transmit a signal at a power on several frequency points within a first pipe. In one embodiment, the signal includes address information of device A. The address information can be device A's ID. The power is a maximum power. The first searching unit 520 is configured to search for device B on at least one frequency point within the first pipe for at most five cycles, wherein the device B's ID matches the device A's ID. The determining unit 530 is configured to determine whether the device B can be found within the first pipe. In one embodiment, a second switching unit (not shown in FIG. 5) is configured to switch from the first pipe to a second pipe if the device B is found within the first pipe. A fourth transmitting unit (not shown in FIG. 5) is configured to transmit a message to device B via the second pipe, wherein the message includes the device A's ID. And a second terminating unit (not shown in FIG. 5) is configured to terminate communication on the frequency point. In another embodiment, a second transmitting unit (not shown in FIG. 5) is configured to transmit matching-code requests at several increasing powers on public frequency points if the device B is be found within the first pipe. For example, 100 matching-code requests are transmitted within a public pipe at each of powers. The first receiving unit 550 is configured to receive ACKs responding to each of the matching-code requests from different devices if the device's ID matches device A's ID for one time. The summing unit 560 is configured to sum numbers of the received ACKs from each device. The comparing unit 570 is configured to compare the summed numbers of the received ACKs from the different devices to get a maximum number. The first switching unit 580 is configured to switch from public pipe to a third pipe of a device that sent the maximum number of ACKs based on the maximum number. That is, the device that sent the maximum number of ACKs is the device B, which can match with the device A. The third transmitting unit (not shown in FIG. 5) is configured to transmit a matching-code package to the device that sent the maximum number of ACKs, wherein the matching-code package includes the device A's ID. And the first terminating unit 590 is configured to terminate communication on one of the public frequency points.

In one embodiment, a second receiving unit and a third receiving unit (both are not shown in FIG. 5) are configured to receive a message including a working frequency point without interference from device B, wherein device A and device B are configured to communicate on the working frequency point.

In one embodiment, the device 500 further comprises a fifth transmitting unit, a first retransmitting unit, a second searching unit, a sixth transmitting unit and a third terminating unit (all of them are not shown in FIG. 5). The fifth transmitting unit is configured to transmit a message within the third pipe on the working frequency point, if there is an interrupt on the second frequency point. The first retransmitting unit is configured to retransmit the message within the third pipe on the working frequency point again if ACK is not received. The second searching unit is configured to search the device B on at least one frequency point for at most five cycles if the ACK is still not received. The sixth transmitting unit is configured to transmit a second matching-code request within the third pipe on the public frequency points when the searching failed. The third terminating unit is configured to terminate communication on one of the public frequency points if the ACK is received.

In another embodiment, the device 500 further comprises a seventh transmitting unit, a second retransmitting unit, a third searching unit, an eighth transmitting unit, and a fourth terminating unit (all of them are not shown in FIG. 5). The seventh transmitting unit is configured to transmit a message within the second pipe on the working frequency point, if there is a communication interrupt on the working frequency point. The second retransmitting unit is configured to retransmit the message within the second pipe on the working frequency point again if ACK is not received. The third searching unit is configured to search the second ID on at least one frequency point for at most five cycles if the ACK is still not received. The eighth transmitting unit is configured to transmit a second matching-code request within the second pipe on the public frequency points when the searching failed. And the fourth terminating unit is configured to terminate communication on one of the public frequency points and communicating on the working frequency point if the ACK is received.

For the above, all transmitting units (i.e., the first transmitting unit to the eighth transmitting unit) can have similar structures and configurations. All searching units (i.e., the first searching unit to the third searching unit) can have similar structures and configurations. All receiving units (i.e., the first receiving unit to the third receiving unit) can have similar structures and configurations. All terminating units (i.e., the first terminating unit to the fourth terminating unit) can have similar structures and configurations.

Figure 6:
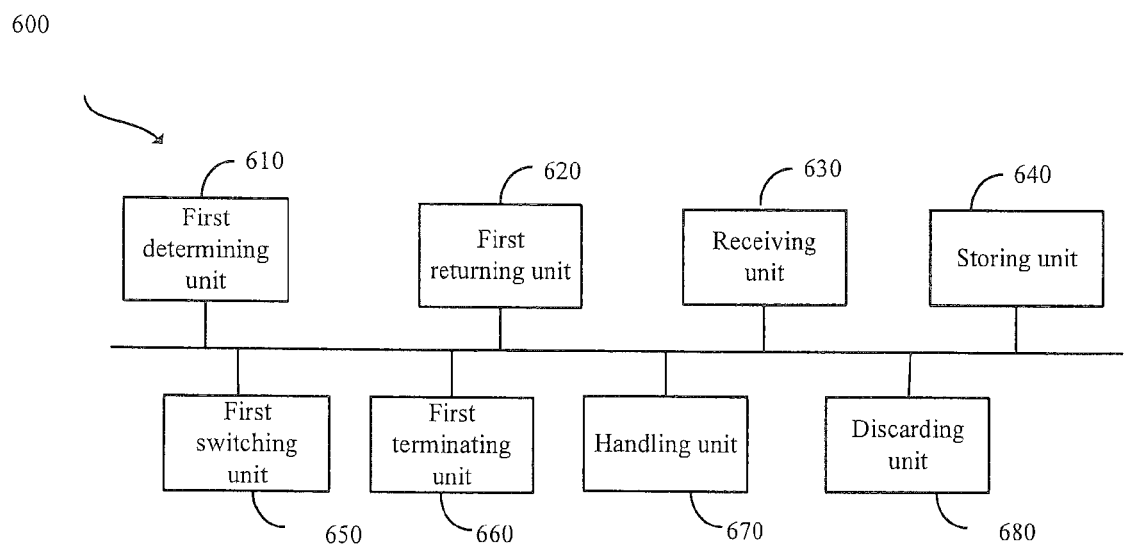
FIG. 6 is a diagram illustrating an embodiment of a device performing the method shown in FIGS. 3 and 4.

FIG. 6 is a diagram illustrating an embodiment of a device 600, such as a dongle, performing the method 300 shown in FIGS. 3 and 4. The device 600 comprises: a first determining unit 610, a first returning unit 620, a receiving unit 630, a storing unit 640, a first switching unit 650, a first terminating unit 660, a handling unit 670, and a discarding unit 680. In one embodiment, the first determining unit 610 is configured to determine whether a first matching-code request has been received within a public pipe or a second pipe on one of public frequency points. The first returning unit 620 is configured to return ACK to device A if the first matching-code request is received within the public pipe, wherein the ACK including device B's ID matching the device A's ID. The receiving unit 630 is configured to receive a matching-code package within a second pipe, wherein the matching-code package includes the device A's ID. The storing unit 640 is configured to store the device A's ID. The first terminating unit 660 is configured to terminate communication on one of the public frequency points.

In another embodiment, if the first matching-code request is received within the second pipe, then a second returning unit (not shown in FIG. 6) is configured to return ACK to device A and the first switching unit 650 is configured to switch from public pipe to the first pipe. A second terminating unit (not shown in FIG. 6) is configured to terminate communication on one of the public frequency points. Then a second switching unit (not shown in FIG. 6) is configured to switch from one of the public frequency points to a working frequency point without interference. A third returning unit (not shown in FIG. 6) is configured to return a message including the working frequency point to the device A on the working frequency point, wherein the device A and the device B are configured to communicate on the working frequency point.

In one embodiment, device B has matched-code with device A and has not been powered off. If a message is received within the second pipe on the working frequency point, wherein the message includes a third ID, then a second determining unit (not shown in FIG. 6) is configured to determine whether the third ID is same with the device A's ID. If yes, then the handling unit 670 is configured to handle the message within the second pipe on the working frequency point. If no, the discarding unit 680 is configured to discard the message. In another embodiment, if a second matching-code request is received within the first pipe on the working frequency point, (for example, device A is restarted and transmits the request through the first pipe), then a fourth returning unit (not shown in FIG. 6) is configured to return ACK to the device A, wherein the ACK includes the device B's ID.

For the above, all determining units (i.e., the first determining unit and the second determining unit) can have similar structures and configurations. All returning units (i.e., the first returning unit to the fourth returning unit) can have similar structures and configurations. All switching units (i.e., the first switching unit and the second switching unit) can have similar structures and configurations. All terminating units (i.e., the first terminating unit and the second terminating unit) can have similar structures and configurations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
    transmitting, at a first power, a first ID within a first channel;
    searching for a second ID on at least one frequency point, wherein the second ID matches the first ID;
    determining whether the second ID is found within the first channel or not
    based on the determination of the second ID not being found within the first channel,
        respectively transmitting, at least at a second power and a third power, at least two matching-code requests within a public channel on public frequency points, wherein the first power, the second power and the third power are different from each other,
        receiving ACKs responding to each of the matching-code requests from different devices,
        summing numbers of the received ACKs from each device,
        comparing the summed numbers of the received ACKs from the different devices to get a maximum number,
        switching from a public channel to a third channel of a device that sent the maximum number of ACKs,
        transmitting a matching-code package to the device that sent the maximum number of ACKs, wherein the matching-code package includes the first ID and the device that sent the maximum number of ACKs is identified by a third ID, and
        terminating communication on one of the public frequency points; and
    switching from the first channel to a second channel if the second ID is found within the first channel,
        transmitting a message to a device identified by the second ID via the second channel, wherein the message includes the first ID, and
        terminating communication on the frequency point.

2. The method of claim 1, further comprising: receiving a message including a working frequency point without interference from the device identified by the third ID, wherein a device identified by the first ID and the device identified by the third ID are configured to communicate on the working frequency point.

3. The method of claim 2, further comprising:
    determining whether there is a communication interrupt on the working frequency point or not,
        transmitting a message within the third channel on the working frequency point based on the determination of there being an communication interrupt on the working frequency point, and determining whether ACK is received or not;
        retransmitting the message within the third channel on the working frequency point again based on the determination of the ACK not being received;
        searching the third ID on at least one frequency point for at most five cycles based on the determination of the ACK still not being received, and determining whether the third ID is found or not on at least one frequency point for at most five cycles;
            transmitting a second matching-code request within the third channel on the public frequency points based on the determination of the third ID not being found; and
        terminating communication on one of the public frequency points based on the determination of the ACK being received and then communicating on the working frequency point.

4. The method of claim 1, further comprising: receiving a message including a working frequency point without interference from the device identified by the second ID, wherein a device identified by the first ID and the device identified by the second ID are configured to communicate on the working frequency point.

5. The method of claim 4, further comprising:
    determining whether there is a communication interrupt on the working frequency point or not,
    transmitting a message within the second pipe on the working frequency point based on the determination of there being an communication interrupt on the working frequency point and determining whether ACK is received or not;
    retransmitting the message within the second pipe on the working frequency point again based on the determination of the ACK not being received;
    searching the second ID on at least one frequency point for at most five cycles based on the determination of the ACK still not being received and determining whether the second ID is found or not on at least one frequency point for at most five cycles;
        transmitting a second matching-code request within the second pipe on the public frequency points based on the determination of the second ID not being found on at least one frequency point for at most five cycles; and
    terminating communication on one of the public frequency points based on the determination of the ACK being received and communicating on the working frequency point.

6. The method of claim 1, wherein the first power is a maximum power.

7. The method of claim 1, further comprising transmitting, at a first power, a first ID on at least one frequency point for at most five cycles.

8. The method of claim 1, wherein the second power is less than the third power.

9. A system, comprising:
    a first transmitter unit, configured to transmit, at a first power, a first ID within a first channel;
    a first searcher unit, configured to search for a second ID on at least one frequency point, wherein the second ID matches the first ID;
    a determiner unit, configured to determine the second ID can be found within the first channel;
    a second transmitter unit, configured to transmit, at least at a second power and a third power, at least two matching-code requests within a public channel on public frequency points based on the determination of the second ID not being found within the first channel, wherein the first power, the second power and the third power are different from each other;

a first receiver unit, configured to receive ACKs responding to each of the matching-code requests from different devices;

a summator unit, configured to sum numbers of the received ACKs from each device;

a comparator unit, configured to compare the summed numbers of the received ACKs from the different devices to get a maximum number;

a first switcher unit, configured to switch from public channel to a third channel of a device that sent the maximum number of ACKs based on the maximum number;

a third transmitter unit, configured to transmit a matching-code package to the device that sent the maximum number of ACKs, wherein the matching-code package includes the first ID and the device that sent the maximum number of ACKs is identified by a third ID;

a first terminator unit, configured to terminate communication on one of the public frequency points; and a second switcher unit, configured to switch from the first channel to a second channel based on the determination of the second ID being found within the first channel;

a fourth transmitter unit, configured to transmit a message to a device identified by the second ID via the second channel, wherein the message includes the first ID; and a second terminator unit, configured to terminate communication on the frequency point.

10. The system of one of claims 9, further comprising:
a second receiver unit, configured to receive a message including a working frequency point without interference from the device identified by the third ID, wherein a device identified by the first ID and the device identified by the third ID are configured to communicate on the working frequency point.

11. The system of claim 10, the determiner unit further configured to determine whether there is a communication interrupt on the working frequency point or not, and the system further comprising:
a fifth transmitter unit, configured to transmit a message within the third channel on the working frequency point based on the determination of there being a communication interrupt on the second frequency point, and wherein the determiner unit further configured to determine whether ACK is received or not;
a first re-transmitter unit, configured to retransmit the message within the third channel on the working frequency point again based on the determination of the ACK not being received;
a second searcher unit, configured to search the third ID on at least one frequency point for at most five cycles based on the determination of the ACK still not being received, and wherein the determiner unit further configured to determine whether the third ID is found or not on at least one frequency point for at most five cycles;
a sixth transmitter unit, configured to transmit a second matching-code request within the third channel on the public frequency points based on the determination of the third ID not being found on at least one frequency point for at most five cycles; and
a third terminator unit, configured to terminate communication on one of the public frequency points based on the determination of the ACK being received.

12. The system of claim 11, wherein:
the first transmitter unit, the second transmitter unit, the third transmitter unit, the fifth transmitter unit and the sixth transmitter unit configured to be a same transmitter unit;
the first searcher unit and the second searcher unit configured to be a same searcher unit;
the first receiver unit and the second receiver unit configured to be a same receiver unit; and
the first terminator unit and the third terminator unit configured to be a same terminator unit.

13. The system of claim 9, further comprising: a third receiver unit, configured to receive a message including a working frequency point without interference from the device identified by the second ID, wherein a device identified by the first ID and the device identified by the second ID are configured to communicate on the working frequency point.

14. The system of claim 13, the determiner unit further configured to determine whether there is a communication interrupt on the working frequency point or not, and the system further comprising:
a seventh transmitter unit, configured to transmit a message within the second pipe on the working frequency point based on the determination of there being an communication interrupt on the working frequency point, and wherein the determiner unit further configured to determine whether ACK is received or not;
a second re-transmitter unit, configured to retransmit the message within the second pipe on the working frequency point again based on the determination of the ACK not being received;
a third searcher unit, configured to search the second ID on at least one frequency point for at most five cycles based on the determination of the ACK still not being received, and wherein the determiner unit further configured to determine whether the second ID is found or not on at least one frequency point for at most five cycles;
an eighth transmitter unit, configured to transmit a second matching-code request within the second pipe on the public frequency points based on the determination of the second ID not being found on at least one frequency point for at most five cycles; and
a fourth terminator unit, configured to terminate communication on one of the public frequency points and communicating on the working frequency point based on the determination of the ACK being received.

15. The system of claim 14, wherein:
the first transmitter unit, the fourth transmitter unit, the seventh transmitter unit and the eighth transmitter unit configured to be a same transmitter unit;
the first searcher unit and the third searcher unit configured to be a same searcher unit;
the first receiver unit and the third receiver unit configured to be a same receiver unit; and
the second terminator unit and the fourth terminator unit configured to be a same terminator unit.

16. The system of claim 9, wherein the first power is a maximum power.

17. The system of claim 9, the first transmitter further configured to transmit the first ID on at least one frequency point for at most five cycles.

18. The system of claim 9, wherein the second power is less than the third power.

\* \* \* \* \*